United States Patent
Garcia et al.

(10) Patent No.: US 8,306,510 B2
(45) Date of Patent: Nov. 6, 2012

(54) PERSON TO PERSON VIRTUAL CASH TRANSFER TRANSACTION USING MOBILE PHONES

(75) Inventors: Rodell Garcia, Mandaluyong (PH); Raul Macatangay, Mandaluyong (PH); Mickey Cayetano, Mandaluyong (PH); Grace Reyes, Mandaluyong (PH); Jewel Dimaano, Mandaluyong (PH); Marlowe Pongol, Mandaluyong (PH); Sheila Jimenez, Mandaluyong (PH); Melenita Quito, Mandaluyong (PH); Jenny Villanueva, Mandaluyong (PH); Justine Camacho, Mandaluyong (PH); Glenn Mendoza, Mandaluyong (PH); Kaytee Reyes, Mandaluyong (PH); Shydee Buizon-Tiambeng, Mandaluyong (PH); Jessica A. Reyes, Phoenix, AZ (US); Joanne Avendano, Pasig (PH); Verna Quinton, London (GB); Alain Bustamante, Mandaluyong (PH); Louie Domingo, Mandaluyong (PH); Fernando P. Teodoro, Mandaluyong (PH); Richard Matotek, Mandaluyong (PH); Andrew Barnham, Baccarat (AU); Justin Ho, Singapore (SG)

(73) Assignees: G-Xchange, Inc., Mandaluyong (PH); Utiba Pty, Ltd., Melbourne Victoria (AU)

( * ) Notice: Subject to any disclaimer, the term of this patent is extended or adjusted under 35 U.S.C. 154(b) by 503 days.

(21) Appl. No.: 12/069,508

(22) Filed: Feb. 11, 2008

(65) Prior Publication Data
US 2009/0157546 A1 Jun. 18, 2009

Related U.S. Application Data

(63) Continuation of application No. PCT/PH2006/000005, filed on May 23, 2006.

(30) Foreign Application Priority Data

Aug. 22, 2005 (PH) .......................... 1-2005-000418

(51) Int. Cl.
H04M 3/42 (2006.01)
(52) U.S. Cl. .................. 455/414.1; 455/406; 455/411; 455/410; 455/466; 455/554; 455/517; 705/21; 705/75; 705/40; 705/42; 705/35; 705/17; 705/43
(58) Field of Classification Search ............... 455/414.1, 455/406, 411, 410, 466, 544.2, 517; 705/21, 705/42, 35, 17, 43, 40, 75
See application file for complete search history.

(56) References Cited

U.S. PATENT DOCUMENTS

| | | | |
|---|---|---|---|
| 2003/0154165 A1* | 8/2003 | Horn et al. | 705/39 |
| 2004/0235450 A1* | 11/2004 | Rosenberg | 455/406 |
| 2006/0006224 A1* | 1/2006 | Modi | 235/379 |
| 2007/0179885 A1* | 8/2007 | Bird et al. | 705/39 |

* cited by examiner

Primary Examiner — Kwasi Karikari
(74) Attorney, Agent, or Firm — Abraham Hershkovitz LLC

(57) ABSTRACT

A person to person cash transfer transaction method using mobile phones comprising the steps of: —sender sends a transfer command to the recipient containing the transfer amount, sender's PIN and the recipient's mobile number; —telco verifies if the sender's mobile phone cash account has sufficient balance to effect the transfer of the amount of virtual cash being transferred; —telco deducts the sender's mobile phone cash account with the amount of virtual cash to e transferred and credits the same amount of recipient's mobile phone cash account; —sender and recipient receive SMS acknowledgment with confirmation number from telco; —recipient if registered may not use the virtual cash for any financial transaction.

1 Claim, 2 Drawing Sheets

PERSON TO PERSON VIRTUAL CASH TRANSFER TRANSACTION USING MOBILE PHONES

RELATED APPLICATIONS

This is a continuation patent application that claims priority to PCT patent application number PCT/PH2006/000005, filed on May 23, 2006, which claims the benefit of Philippines application no. 1-2005-000418, filed on Aug. 22, 2005, the entirety of which are herein incorporated by reference.

FIELD OF INVENTION

This invention relates in general to a person-to-person cash transfer transaction using mobile phones.

Heretofore, the manner of transferring cash from person-to-person is by going to a bank and depositing money to a recipient's bank account. This is time consuming since you have to line up at the bank.

With the advent of mobile phones, the following transactions, namely: (a) balance inquiry, (b) airtime load transfers, (c) funds transfer from one account to another account where both accounts are maintained by one bank, and (d) bills payment where funds are transferred from one account to another account where both accounts are maintained by one bank, are completed by sending Short Messaging Service (SMS) commands using mobile phones. However, transferring cash from person-to-person are still being done over-the-counter.

It is the primary object of the present invention to provide a transaction system wherein one can use his mobile phone to transfer virtual cash to the recipient's mobile phone cash account. Upon receipt of the cash account in his mobile phone, the recipient must register in telco's cash product service to enable him to perform financial transactions.

Still an object is to provide a virtual cash transfer transaction that is available through the telco's cash product services wherein banking transactions and credit card transactions are virtually eliminated so that service fees are trimmed down to the minimum.

Another object is to provide a person-to-person virtual cash transfer transaction using mobile phone wherein the mobile phone and its wireless network are emerging as an environment where the value of money is securely stored and transferred from one person to another.

Figure 1:
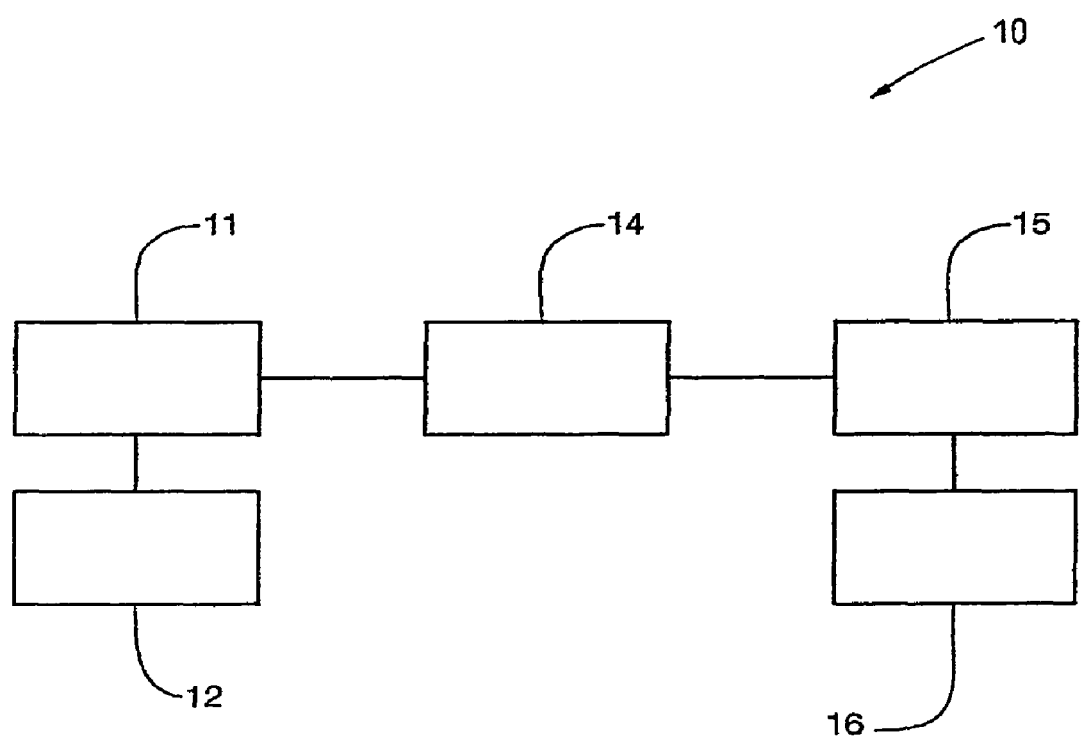
Figure 2:
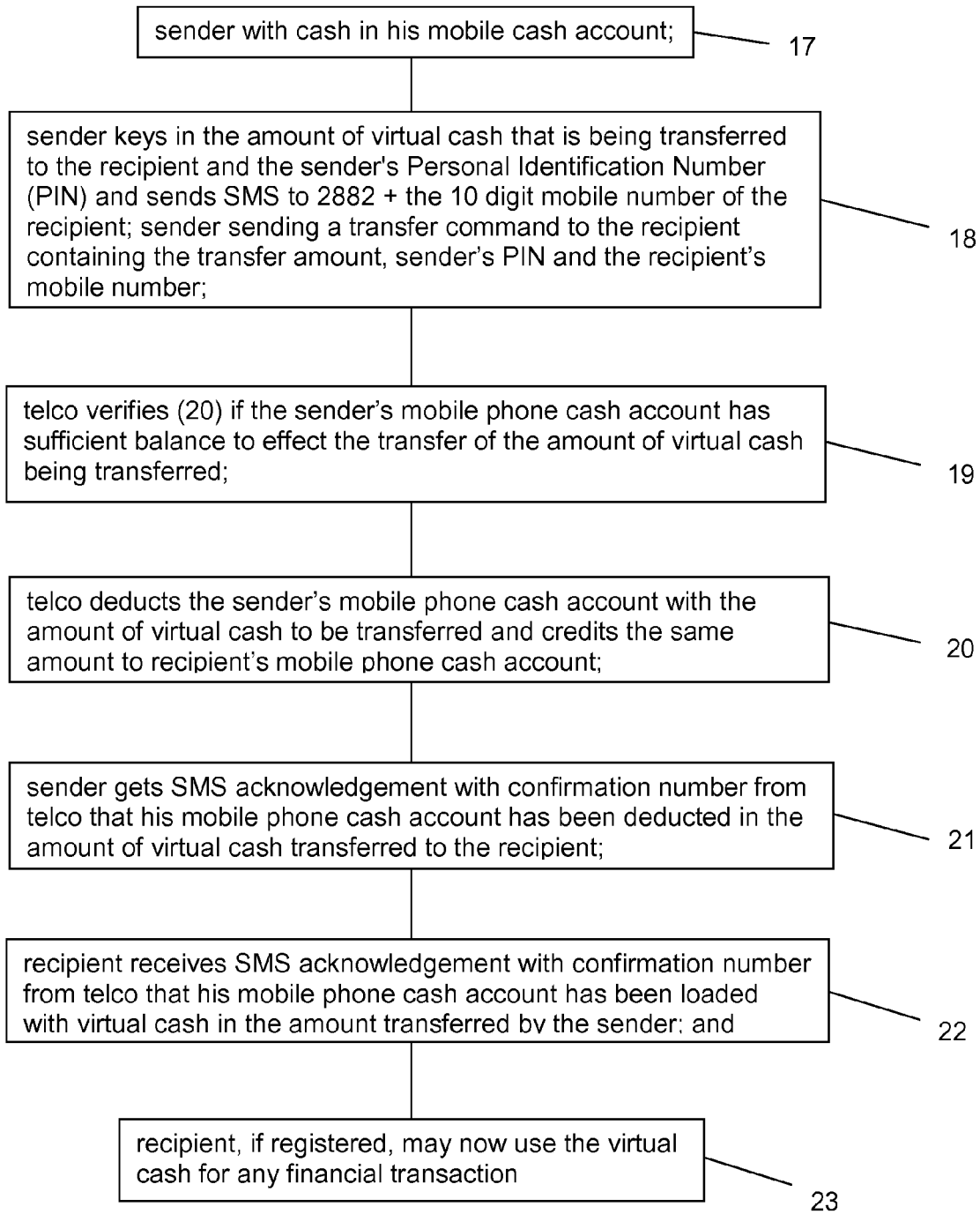

These and other objects and advantages of the present invention will become apparent upon reading the following detailed description taken in conjunction with the appended drawing wherein:

FIG. 1 is a block diagram of the components involved in the transaction; and FIG. 2 is a flow chart of the transaction.

Referring now to several views of the drawings wherein like reference numerals designate same parts throughout, there is shown my invention for a person to person virtual cash transfer transaction method using mobile phone generally designated as 10.

The transaction method involves theses components, a sender 11 with his mobile phone cash account 12, a telco 14 a recipient 15 with his mobile phone 16. All being interconnected by software.

The sender must first have virtual cash in his mobile phone cash account (17).

The sender keys in (18) the amount of virtual cash that is being transferred to the recipient and the sender's Personal Identification Number (PIN) and sends SMS to 2882+the 10 digit mobile number of the recipient.

The telco verifies (20) if the sender's mobile phone cash account has sufficient balance to effect the transfer of the amount of virtual cash being transferred.

The telco deducts the sender's mobile phone cash account with the amount of virtual cash to be transferred and credits the same amount to recipient's mobile phone cash account.

The sender gets (_) SMS acknowledgment with confirmation number from telco that his mobile phone cash account has been deducted in the amount of virtual cash transferred to the recipient.

The recipient receives (22) SMS acknowledgment with confirmation number from telco that his mobile phone cash account has been loaded with virtual cash in the amount transferred by the sender.

The recipient if registered may now use the virtual cash for any financial transaction.

We claim:

1. A person to person cash transfer transaction method using mobile phones, the method comprising:

a sender utilizing virtual cash in his mobile cash account;

the sender keying in an amount of virtual cash that is being transferred to a recipient and the sender's Personal Identification Number (PIN), and sending a short messaging service (SMS) message to a telco by inputting the telco's mobile money transfer access code and the recipient's mobile number;

the sender sending a transfer command to the recipient containing the transfer amount, the sender's PIN, and the recipient's mobile number;

the telco verifying if the sender's mobile phone cash account has a sufficient balance to effect the transfer of the amount of virtual cash being transferred;

the telco deducting the sender's mobile phone cash account with the amount of virtual cash to be transferred and crediting the same amount to the recipient's mobile phone cash account;

the sender receiving a SMS acknowledgement with a confirmation number from the telco that his mobile phone cash account has been deducted in the amount of virtual cash transferred to the recipient;

the recipient receiving the SMS acknowledgement with the confirmation number from the telco that his mobile phone cash account has been loaded with virtual cash in the amount transferred by the sender; and the recipient utilizing the virtual cash for any financial transaction.

* * * * *